United States Patent [19]

Bateman

[11] Patent Number: 4,887,337
[45] Date of Patent: Dec. 19, 1989

[54] CORD CINCHING DEVICE
[75] Inventor: Brian Bateman, Orillia, Canada
[73] Assignee: Polytech Netting Industries, Mississauga, Canada
[21] Appl. No.: 292,097
[22] Filed: Dec. 30, 1988
[51] Int. Cl.[4] .............................................. F16G 11/00
[52] U.S. Cl. .................................. 24/136 R; 24/136 K
[58] Field of Search ............. 24/136 R, 136 K, 136 L, 24/503; 403/211

[56] References Cited
U.S. PATENT DOCUMENTS

| | | | |
|---|---|---|---|
| 866,144 | 9/1907 | Kobert | 24/136 R |
| 1,545,889 | 7/1925 | Everson | 24/136 R |
| 4,336,636 | 6/1982 | Ishiguro et al. | 24/136 K |
| 4,506,417 | 3/1985 | Hara | 24/136 R |
| 4,680,835 | 7/1987 | Horng | 24/136 R |

FOREIGN PATENT DOCUMENTS

| | | | |
|---|---|---|---|
| 924762 | 8/1947 | France | 24/136 R |
| 93910 | 4/1922 | Switzerland | 24/136 R |

Primary Examiner—Victor N. Sakran
Attorney, Agent, or Firm—Cushman, Darby & Cushman

[57] ABSTRACT

The disclosure herein describes a device for cinching a cord; it comprises an outer body, having a cord entrance and a cord exit, and an inner body having a channel allowing the cord to extend from the entrance to the exit and a pair of opposite gripping surfaces which serve to secure the cord in a cinched condition. A finger actuated unlatching slide carries a stirrup which releases the cord from the gripped surfaces.

6 Claims, 2 Drawing Sheets

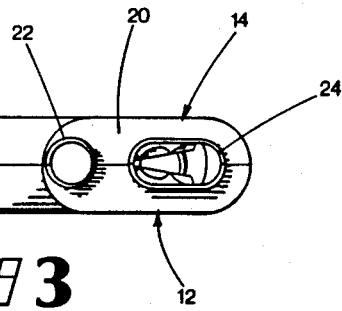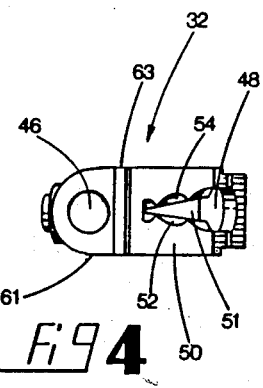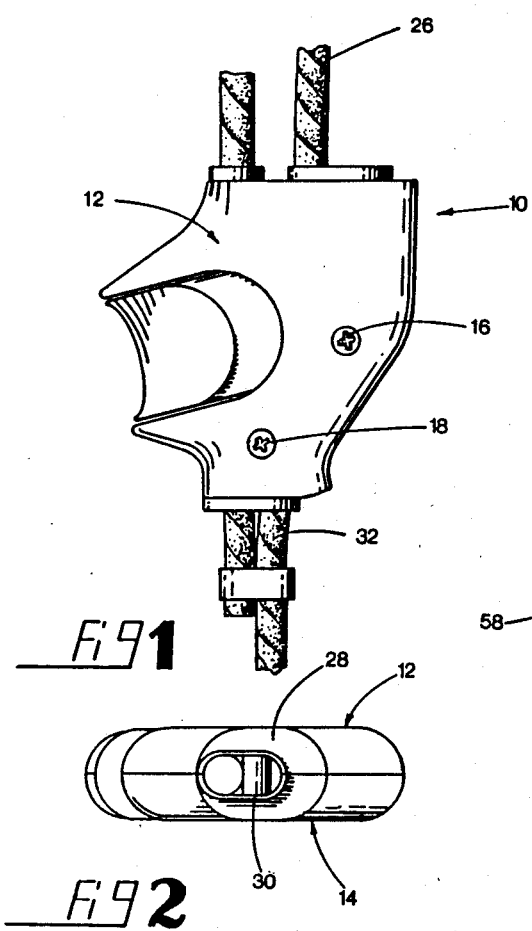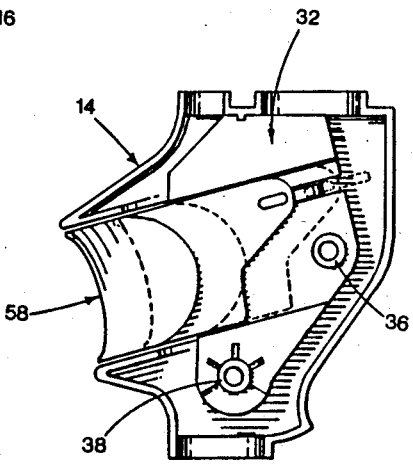

CORD CINCHING DEVICE

FIELD OF THE INVENTION

The present invention pertains to a cord cinch device and, more particularly, to a device having means for firmly gripping a cord and means for releasing this cord from a gripped condition.

BACKGROUND OF THE INVENTION

It is often required to tightly cinch a single cord or one girding a net, such as a mesh net, adapted to surround a variety of loads on a floor or a platform. One example of such a net is described in Canadian Patent Application No. 522,399, filed Nov. 6, 1986, in the name of Purdy, and assigned to the present applicant. This application describes a load restraint net particularly intended to be mounted in the trunk of a sedan vehicle or the rear of a station wagon vehicle to restrain loads, such as luggage, baggage, groceries, bags or the like.

It has been found during the development of such a product that a device to cinch the rope or cord was needed, which device had to:

(i) allow infinite adjustment of the rope or cord length to accept large or small item and hold them firmly in place;
(ii) be completely self-contained;
(iii) not require mounting to a frame for support;
(iv) feature one-handed release capability;
(v) have a built-in safety feature, automatically locking the rope or cord when not properly secured by user;
(vi) be sturdy enough to withstand a crash situation;
(vii) be both aesthetically pleasing and ergonomically correct; and
(viii) be user friendly and simple to handle.

OBJECTS AND STATEMENT OF THE INVENTION

It is an object of the present invention to provide a cord cinch device which is simple in construction and which may be easily operated either to cinch or to release a cinched cord.

This is achieved by providing a device which comprises: an outer body having a cord entrance and a cord exit; means for channeling and gripping the cord when extending in the body between the entrance and the exit thereof; the gripping means including an inner body secured to the outer body and displaying a wedge slot defining a pair of opposite gripping surfaces adjacent the cord exit; and unlatching means slidably mounted to the inner body for disengaging the cord when gripped in the surfaces; the unlatching means include a stirrup receiving the cord therethrough and being adapted, when the unlatching means are actuated, to release the cord from engagement in the gripping surfaces.

In one form of the invention, the unlatching means consist of a finger actuated U-shaped slide member on which the stirrup is mounted, the slide and the stirrup cooperating to release the cord from a cinched condition.

In a further form of the invention, the slide returns to an initial position under the action of a spring after being actuated.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 1 is a side elevational view of a cord cinch device according to the present invention;

FIG. 2 is an end view of the device as seen from the top of FIG. 1;

FIG. 3 is an opposite end view thereof as seen from the bottom of FIG. 1;

FIG. 4 is an end view similar to FIG. 3 with the outer body removed and showing the inner body of the device;

FIG. 5 is an elevational view showing inside the device;

DESCRIPTION OF PREFERRED EMBODIMENTS

Figure 6:
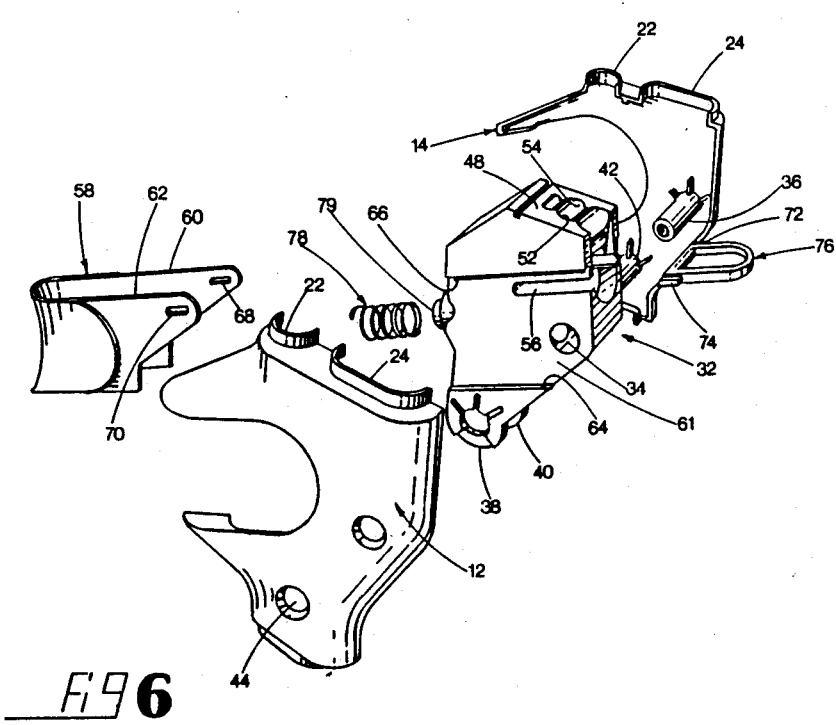
FIG. 6 is an exploded view showing all the components of the device.

Referring to FIGS. 1-3, there is shown a cord cinch device, generally denoted 10, having an outer body formed of two half shells 12 and 14 secured together by means of fastening screws 16 and 18. The end wall 20 of the body displays an entrance 22 and an exit 24 for a cord 26. The opposite end wall 28 of the body displays an opening 30 allowing for the entrance and exit of a second cord 32.

Referring to FIGS. 4, 5 and 6, the two half shells 12 and 14 enclose an inner body 32 which is traversed by a cavity 34, circular in cross-section, that fits over a sleeve 36 integrally mounted to the half shell 14 and in which screw 16 is received. The inner body 32 also includes a pair of ring-like extensions 38 and 40 which are adapted to be fitted over another sleeve 42 integrally formed with the half shell 14 and in which screw 18 is received.

The inner body 32 comprises a circular entrance hole 46 which is in registry with the entrance opening 22 when assembled in the outer body. This hole is the entrance of a straight channel 47 (see FIG. 7) which is continuous with a second channel 48 that allows a cord to be folded back in a path parallel to its path at entrance 22. The end wall 50 of the inner body displays a wedge slot 51 defining a pair of opposite gripping surfaces 52 and 54. The inner body 32 also includes a narrow slot 56 which traverses the return channel 48.

A finger actuated slide 58 defines a U-shape with the opposite extending arms 60 and 62 thereof adapted to fit over and slide on each opposite sidewalls 61 and 63 of the inner body, each displaying upper and lower shoulders (64 and 66 on sidewall 61) serving as guides for the upper and lower edges of the side arms of the slide. The extremity of each side arm includes an opening 68, 70, into which is fitted an opposite ear 72, 74, of a stirrup 76. This stirrup has a configuration to fit in slot 56 of the inner body.

A spring 78 extends between the inner wall of slide 58 and a projection 79 on the inner body to allow the slide to return to an initial position after being pressed against the spring action towards the inner body.

Figure 7:
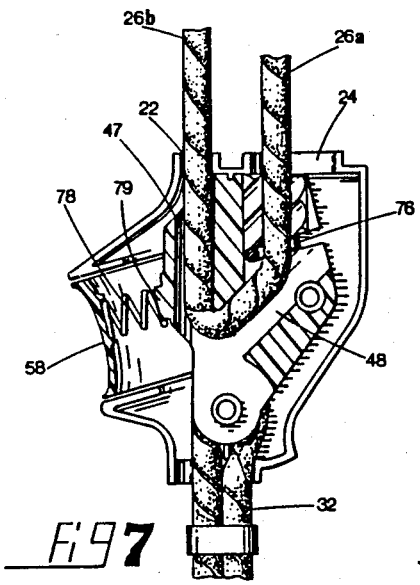
FIG. 7 is an elevational view, partly cross-sectional, showing a cord cinched condition.

FIG. 7 shows the cord 26 in a cinched condition. The cord passes through entrance 22 of the outer body, in channel 47 of the inner body, then turns in channel 48 to pass through the stirrup 76, in the wedge slot 51 and finally through the exit opening 24 of the outer body. The cord is shown engaged between the gripping surfaces 52 and 54 of the wedge slot. Spring 78 maintains the slide 58 in the outward position so that the stirrup 76 does not exert any force on the cord gripped by the surfaces.

Figure 8:
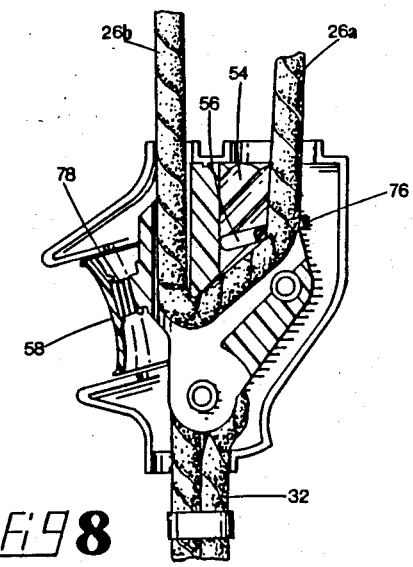
FIG. 8 is an elevational view, partly cross-sectional, showing the cord unlatching operation.

To unlatch the cord (see FIG. 8), slide 58 is pressed against the action of spring 78 causing its arms 62 and 60 to move the stirrup 76 outwardly, thereby releasing the cord 26 from its gripping engagement between surfaces 52 and 54.

With the device 10 safely secured to a cord 32, a pull on the cord portion 26a with cord portion 26b connected to a net in load covering or retaining condition will provide load tightness which will be maintained when slide 58 returns to the position shown in FIG. 7.

Although the invention has been described above in relation to one specific form, it will be evident to a person skilled in the art that it may be refined and modified in various ways. It is therefore wished to have it understood that the present invention should not be limited in interpretation except by the terms of the following claims.

The embodiments of the invention in which an exclusive property or privilege is claimed are defined as follows:

1. A cord cinch device comprising:
   (a) an outer body having a cord entrance and a cord exit;
   (b) means for channeling and gripping said cord when extending in said body between said entrance and said exit; said channeling and gripping means including an inner body secured to said outer body and displaying a wedge slot defining a pair of opposite gripping surfaces adjacent said cord exit; and
   (c) unlatching means slidably mounted to said inner body for disengaging said cord when gripped in said surfaces; said unlatching means including a stirrup receiving said cord therethrough and being adapted, when said unlatching means are actuated, to release said cord from engagement in said gripping surfaces and a finger actuated U-shaped slide member; said stirrup being fixedly mounted to said slide member and cooperating therewith to release said cord from a cinched condition.

2. A cord cinch device as defined in claim 1, wherein said entrance and said exit are displayed on a same sidewall of said outer body.

3. A cord cinch device as defined in claim 2, further comprising on an opposite sidewall of said outer body, entrance and exit means for receiving therein a second cord.

4. A cord cinch device as defined in claim 1, further comprising spring means extending between said slide member and said inner body for returning said slide member to an initial position after a cord unlatching operation.

5. A cord cinch device as defined in claim 4, further comprising guide means on said inner body for slidingly receiving opposite arms of said U-shaped slide member.

6. A cord cinch device as defined in claim 5, further comprising a slot in said inner body allowing movement of said stirrup relative thereto.

* * * * *